United States Patent

Shafer et al.

Patent Number: 5,358,307
Date of Patent: Oct. 25, 1994

[54] CONSOLE

[75] Inventors: Russell P. Shafer; Scott S. Bainbridge; Dale J. Frye; David J. Spykerman; Nathan W. Young, all of Holland, Mich.

[73] Assignee: Prince Corporation, Holland, Mich.

[21] Appl. No.: 855,199

[22] Filed: Mar. 20, 1992

[51] Int. Cl.⁵ .................................................. A47C 7/62
[52] U.S. Cl. ................................................... 297/188
[58] Field of Search ........................ 297/188, 194, 191; 100/44, 45, 46

[56] References Cited

U.S. PATENT DOCUMENTS

| | | |
|---|---|---|
| 1,398,884 | 11/1921 | Aills . |
| 2,229,937 | 1/1941 | Reese . |
| 2,547,547 | 4/1951 | Tatar . |
| 2,822,968 | 2/1958 | Jackson .................. 297/188 |
| 2,922,515 | 1/1990 | Barnes . |
| 2,979,120 | 4/1961 | Amburn .................. 297/188 |
| 3,042,467 | 7/1962 | Germick .............. 297/188 X |
| 3,125,372 | 3/1964 | Rose .................... 297/188 |
| 3,526,314 | 9/1970 | Trammell, Jr. . |
| 3,913,810 | 10/1975 | Shaw . |
| 3,942,691 | 3/1976 | Sisak . |
| 4,131,313 | 12/1978 | Jacobs ................... 297/188 |
| 4,387,924 | 6/1983 | Fernandez .............. 297/188 |
| 4,500,059 | 2/1985 | Papizan . |
| 4,681,219 | 7/1987 | Kitchens . |
| 4,745,704 | 5/1988 | Schaefer . |
| 4,747,639 | 5/1988 | Pfau .................... 297/188 X |
| 4,927,200 | 5/1990 | Wilkins . |
| 5,048,083 | 10/1991 | Dunchock . |

FOREIGN PATENT DOCUMENTS

| | | | |
|---|---|---|---|
| 338984 | 3/1936 | Italy .................... | 297/188 |
| 699584 | 11/1953 | United Kingdom . | |

Primary Examiner—Jose V. Chen
Attorney, Agent, or Firm—Price Heneveld Cooper DeWitt & Litton

[57] ABSTRACT

A console includes a housing which attaches to the underlying frame of a seat and moves with the seat such that it positions the console in fixed relationship to the occupant of the seat as the seat may be moved to different positions for different passengers or drivers. In one embodiment, the housing is L-shaped to provide storage along one side of the seat as well as along the front. In one embodiment the side of the housing includes an adjustable strap for holding articles such as a briefcase, purse or satchel to the side of the console. At least one storage bin which may or may not be covered is positioned for access from above.

4 Claims, 3 Drawing Sheets

CONSOLE

BACKGROUND OF THE INVENTION

The present invention pertains to consoles for vehicles and particularly to a console which is mounted to the seat of a vehicle.

There exists a variety of storage locations in vehicles which have been popular over the years. One location, naturally is a glove box in the instrument panel area of a vehicle, Other locations have included armrests with storage compartments and side pockets of doors. Some vehicles include floor consoles located between the seats of a vehicle which also includes storage areas for miscellaneous items. Some suggestions for storage containers which attach to vehicle seats have aiso, been but have not found widespread commercialization for use modern vehicle designs. The downsizing of vehicles has also made it increasingly difficult to provide significant storage areas for larger miscellaneous personal items such as purses, satchels, briefcases, umbrellas, and other items which typically are tossed in the rear seat area their subsequent retrival somewhat difficult.

SUMMARY OF THE PRESENT INVENTION

There exists a need for an innovative console for use in modern compact vehicles which storage for a variety of larger miscellaneous articles and which utilizes areas of the vehicle which have not been fully developed, The present invention accomplishes this goal by providing a housing which attaches to the underlying frame of a seat and moves with the seat such that it positions the console in fixed relationship to the occupant of the seat as the seat may be moved to different positions for different passengers or drivers. This area provides a readily accessible and convenient location for storage near the side, and in some embodiments at the front of the persons seat and lap area. In one embodiment, the housing includes an adjustable strap means for holding articles such as a briefcase, purse or satchel to the side of the console while the vehicle is in motion and at least one storage bin which may or may not be covered and which is positioned for access from above. In some embodiments of the invention, the housing extends along one side of the vehicle seat and in other embodiments, it includes at least a portion extending forwardly and around the front lip of the seat at a relatively low level to allow clearance for the persons legs and still provide significant additional storage volume. In one embodiment of the invention, the console is generally L-shaped extending around two sides of the seat with storage compartments located at the forward end and the side.

These and other features, objects and advantages of the present invention will become apparent to those skilled in the art by reading the following description thereof together with reference to the accompanying drawings; in which:

DETAILED DESCRIPTION OF THE PREFERRED EMBODIMENT

Figure 1:
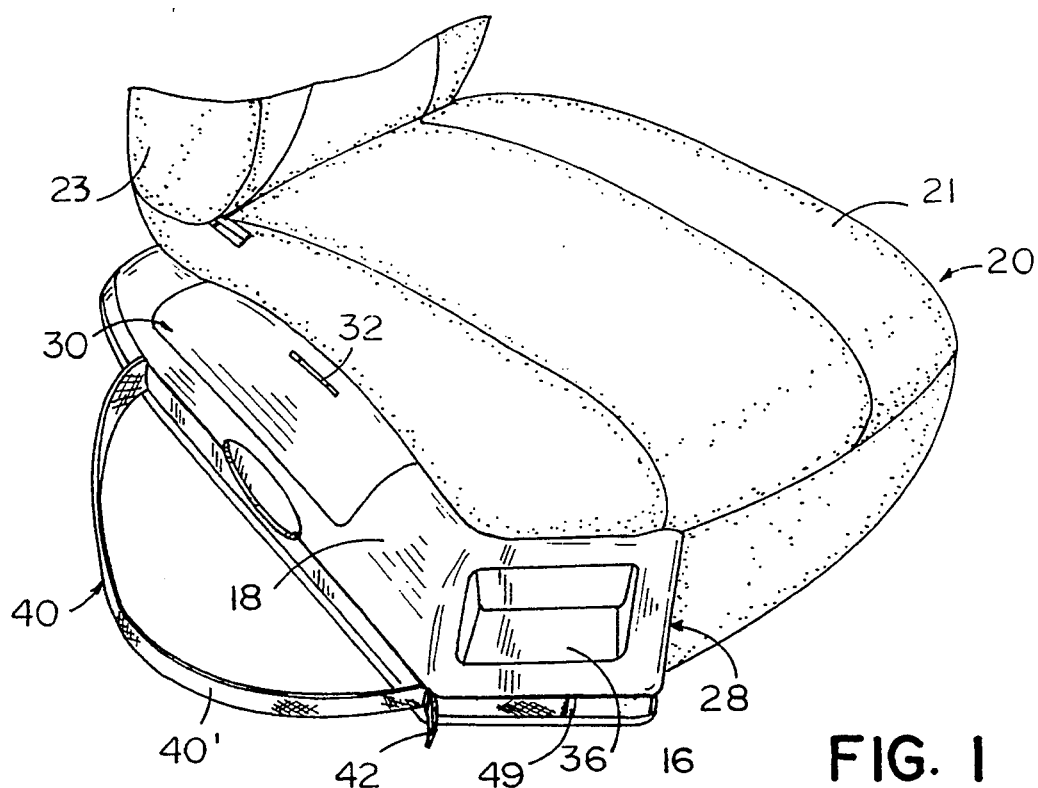
FIG. 1 is a fragmentary perspective view of a vehicle seat including a console embodying the present invention mounted thereto.
Figure 2:
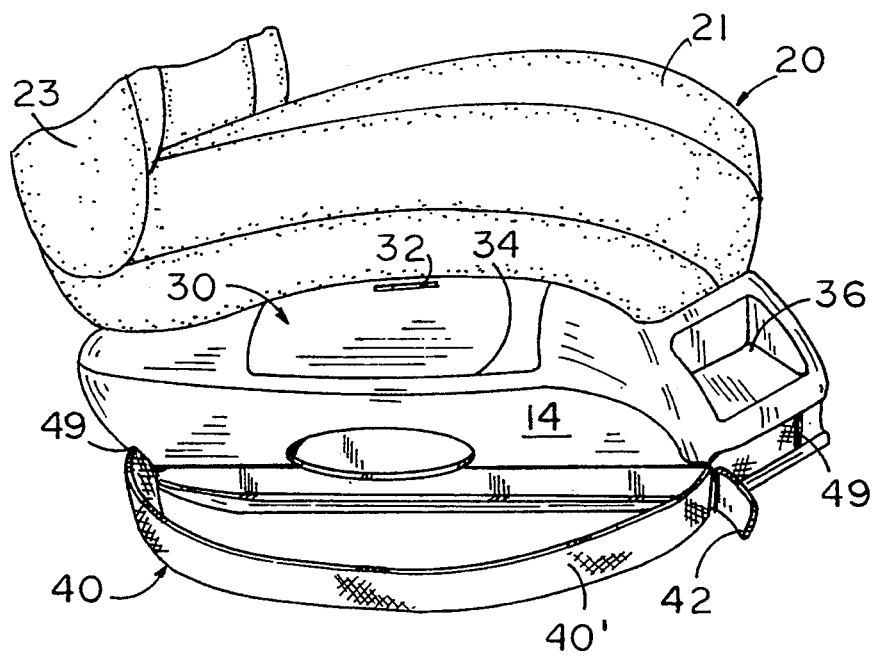
FIG. 2 is a right side elevational view of the structure shown in FIG. 1.
Figure 3:
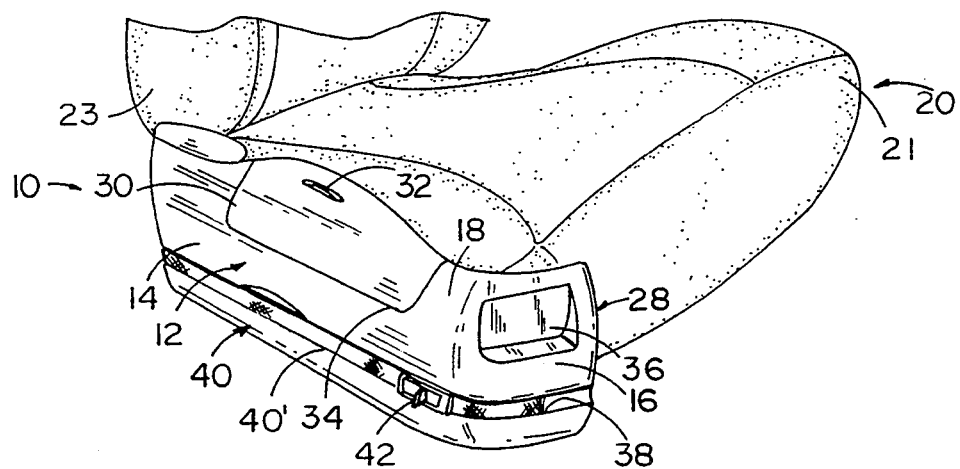
FIG. 3 is a perspective view of the structure shown in FIGS. 1 and 2 with the accessory strap shown in the stored position.
Figure 8:
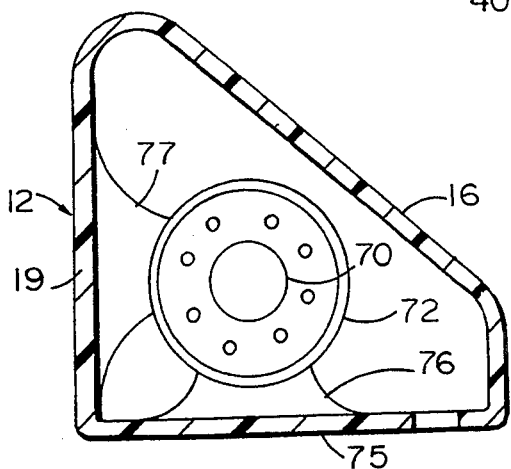
FIG. 8 is a cross-sectional view of a portion of the console seen in FIG. 4 taken along section lines VIII—VIII of FIG. 4.
Figure 6:
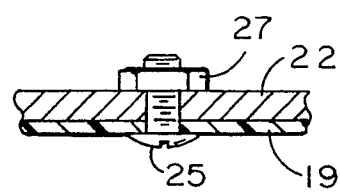
FIG. 6 is an enlarged cross-sectional view of one attachment location of the housing of the console of the present invention to the seat support.

Referring initially to FIGS. 1-3, there is shown a first embodiment of the invention which comprises a generally L-shaped console 10 mounted to the side of a vehicle seat 20 and to the underlying support frame 22 (FIG. 6) of the seat. Seat 20 includes a generally horizontally extending seat 21 and an integral adjustable back 23 both of which are mounted to the support frame 22 in a conventional manner. The embodiment illustrated shows a passenger side seat of a vehicle such as an automobile. Console 10 preferably is generally L-shaped with a first or side leg extending along the side of the seat and a second or front leg which extends at least partially along the front of the seat. The console includes an integrally molded housing 12 made of a suitable material such as polyvinylchloride (PVC), ABS, polycarbonate or other suitable polymeric material used for vehicle interior accessories. Housing 12 integrally includes an outer side wall 14, a front wall 16, a top wall 18 and inner or rear wall 19 (FIGS. 6 and 8).

The housing 12 is generally hollow to define an interior storage cavity which includes an access cover 30 which integrally includes an opening handle 32 and which has concealed hinge means along its lower edge 34 for allowing the cover 30 to open in a direction away from the seat such that the user can gain access to a storage bin formed within housing 12 under the cover 30. The storage receptacle can conventionally be in the form of a bin or basket which is integrally molded to the inner surfaces of outer wall 14 and top wall 18 of the console or can be a cloth sack-like container which is suitably attached to the interior of the console under cover 30. The forward section 28 of the generally L-shaped console 10 also may include an open storage bin 36 integrally molded therein.

Figure 4:
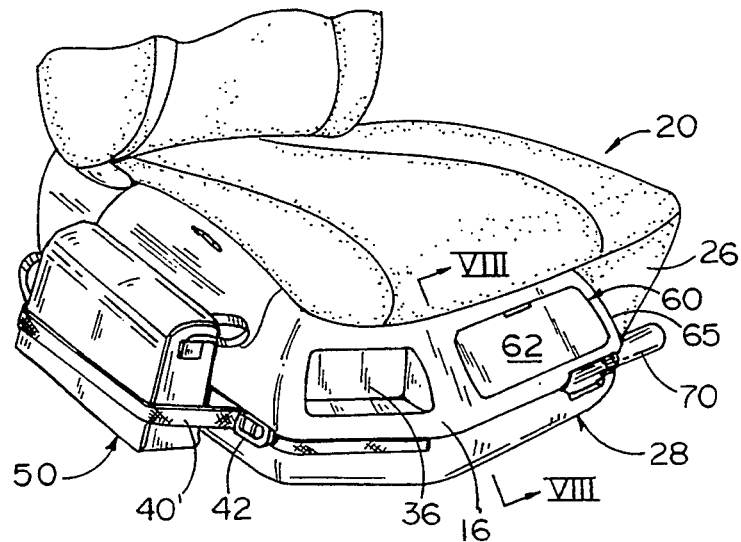
FIG. 4 is a fragmentary perspective view of an alternative embodiment of the present invention including a forward storage area.

Console 10 also includes a lower elongated rectangular recess 38 extending along the lower half of outer wall 14 of housing 12 for nestably receiving an adjustable strap 40 therein as best seen in FIG. 3. Strap means 40 is employed for securing a briefcase, satchel, purse or other package-like object 50 as seen in the alternative embodiment of FIG. 4, to the side of seat 20 in the space between the seat and the inner surface of the door adjacent the seat. Strap 40 can therefore be moved between a stored position as illustrated in FIG. 3 to use positions as illustrated in FIGS. 1, 2 and 4 and is made of a suitable nylon web material. The strap includes an adjustable buckle 42 to allow the strap to be adjusted between the stored position shown in FIG. 3 and the use position for holding packages 50 such as shown in FIG. 4. The construction and mounting of strap means 40 is shown schematically in FIG. 7 and can take a variety of forms.

Figure 7:
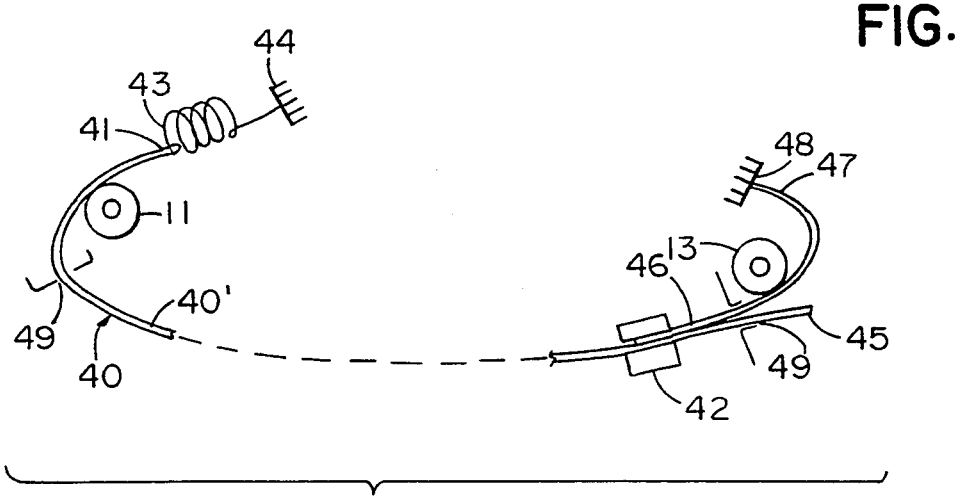
FIG. 7 is a schematic view of the mounting of the accessory strap shown in FIGS. 1–4 to the console.

Referring to FIG. 7, strap means 40 includes, in the preferred embodiment, a first strap 40' with one end 41 which is secured to one end of a tensioning spring 43 having its opposite end secured to the console by an anchor member illustrated schematically at 44 in FIG. 7. Anchor member 44 could be in the form of a lug and screw securing the end of spring 43 remote from strap end 41 to the interior wall 19 of the console and thence to the seat frame 22 as, for example, to the fastener 25 seen in FIG. 6 which has a backing nut 27 for securing the console to the vehicle. The opposite end 45 of strap 40' is a free end which passes through the buckle 42 and is lockably secured thereto in an adjustable fashion. Buckle 42 is of the type used in airlines allowing for adjustment of the free end of the strap. The strap means 40 includes a second strap 46 having a first end secured to the buckle 42 and an opposite end 47 anchored by an anchor member 48 to the console in the same general conventional manner as the end of tensioning spring 43. The straps pass through suitable apertures 49 illustrated schematically in FIG. 7 formed in the side 14 of the housing near the forward and rear edges such that the ends of the straps are concealed. Typically, buckle 42 will adjust the strap means 40 to the general shape of a briefcase, package, or satchel to be held adjacent the outer side wall 14 of the console as seen in FIG. 4 and fixed in a selected position whereupon the tensioning spring 43 snugly holds the object against the side of the console. Thus, buckle 42 is used for gross adjustments of the size of the strap while tensioning spring 43 is employed for providing a holding force for the strap against the package 50.

In other embodiments, the buckle end 47 of strap section 46 may include the tensioning spring while end 41 of strap 40 is coupled directly to the console wall 19. In a preferred embodiment, the console 10 may include a roller 11 shown schematically in FIG. 7 around which the strap is guided and a second roller 13 at the buckle end of the strap means. Alternatively, the edges of slots 49 through which the strap sections pass can be enforced and include rounded edges to provide the desired radius of curvature for the strap and its mounting within console housing 12.

Figure 5:
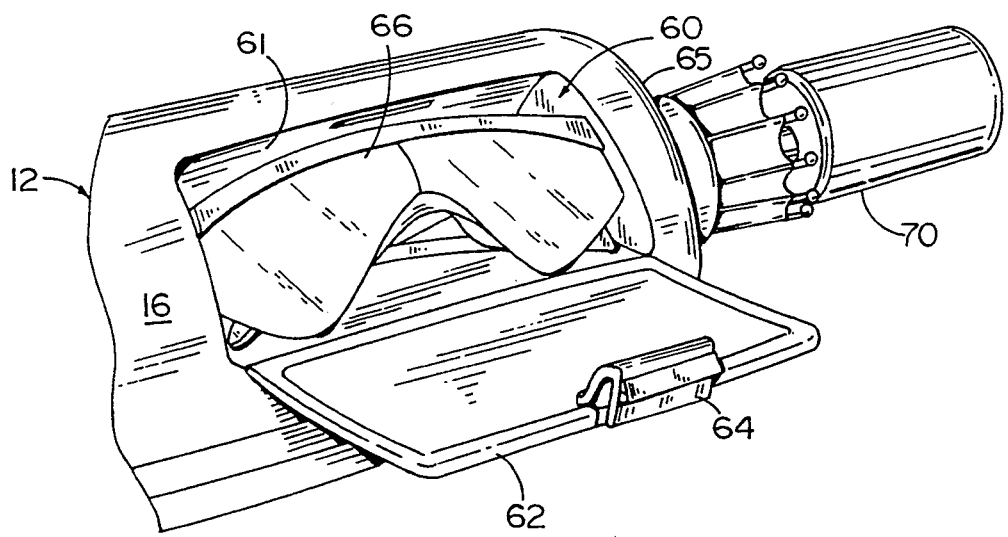
FIGS. 5 is an enlarged fragmentary perspective view of a portion of the structure shown in FIG. 4.

The console shown in FIGS. 1–3 can be expanded to continue more forwardly along the front edge 26 of seat 21 as shown in FIGS. 4–5, and 8 to include an additional storage location 60 shown in detail in these Figs. In this embodiment, storage location 60 includes a first storage compartment 61 having a pivoted cover 62 with an integral spring-loaded latch 64 for storing relatively small objects such as sunglasses 66 therein. The interior of bin 61 integrally includes walls which mate with the outer front wall 16 of housing 12. Behind bin 61 the storage location 60 provides a side storage bin with access through an end wall aperature 65 for storing tubular objects such as a compact umbrella 70. This cylindrical storage bin is defined by cylindrical housing 72 (FIG. 8) supported to the rear wall 19 of housing 12 by a plurality of spaced integral webs 73 and to floor sections 75 of housing 12 (which may optionally be included in one or more sections of the housing) by webs 76. Cylindrical member 72 may include suitable openings in the lower sides for allowing ventilation and drainage of moisture from a wet umbrella 70 when placed therein.

As can be seen in the Figs., console 10 is shaped to generally conform to the lower peripheral boundary of the seat frame underlying seat 21 to provide a trim appearance to the installation which conforms to that of the vehicle. For such purpose, the outer surfaces of the housing can be textured and colored to match the interior of a particular vehicle to which the console can be added. The provision of an L-shaped console either in the form of FIGS. 1–3 or the elongated L-shaped shown in the FIG. 4 console provides significant storage for the vehicle which is particularly beneficial in compact design vehicles where storage locations are at a premium. It will become apparent to those skilled in the art that various modifications to the preferred embodiments of the present invention disclosed herein can be made without departing from the spirit or scope thereof as defined by the appended claims.

The embodiments of the invention in which an exclusive property or privilege is/claimed are defined as follows.

1. A console for use with a vehicle seat comprising:
a housing made of an integrally molded polymeric material and having an outer wall, an upper wall and an inner wall wherein said inner wall is shaped to extend along and attach to the side of a seat of a vehicle, and a storage bin formed in said housing, wherein said housing includes a cover to provide access to said storage bind for storing articles, and an adjustable strap mounted to said housing to extend along said outer wall for holding objects between said outer wall and said housing, said housing including an elongated recess for nestably receiving said strap when not in use.

2. A console for use with a vehicle seat comprising:
a housing having an outer wall, an upper wall and an inner wall shaped to extend along and attach to the side of a seat of a vehicle and a storage bin formed in said housing, wherein said housing includes a cover mounted in said outer wall to provide access to said storage bin for storing articles, and further including adjustable strap means mounted thereto for retaining an article between said outer wall and said strap, wherein said strap means includes means including a buckle for providing an adjustment to the length of said strap means, and means for tensioning said strap means for applying a holding force to an article held thereby, and wherein said strap means includes first and second straps and said buckle is mounted to one end of said second strap which has an opposite end attached to said housing and said first strap has one end which passes through said buckle, and wherein said tensioning means comprises a tensioning spring extending between an opposite end of said first strap and said housing, wherein said housing includes an elongated recess extending longitudinally along the outside of said outer wall for nestably receiving said strap means when not in use.

3. The apparatus as defined in claim 2 wherein said housing includes at least one storage bin opening through said outer wall.

4. A vehicle seat and console comprising:
a vehicle seat having a seat with a side, a back, and a frame supporting said seat;
a housing having an outer wall, an upper wall and an inner wall defining a storage bin therebetween, said housing attached to said side of said seat, said outer wall including cover means providing access to said storage bin for receiving an article therein, wherein said housing includes strap means for retaining an article between said outer wall and said strap, wherein strap means includes means including a buckle for providing an adjustment to the length of said strap means, wherein said strap means further includes means for tensioning said strap for applying a holding force to an article held thereby, wherein said strap means includes first and second straps and said buckle is mounted to one end of said second strap which has an opposite end attached to said housing and said first trap has one end which passes through said buckle, and wherein said tensioning means comprises a tensioning spring extending between an opposite end of said first strap and said housing, and wherein said housing includes an elongated recess extending longitudinally along the outside of said outer wall for nestaby receiving said strap means when not in use.

* * * * *

UNITED STATES PATENT AND TRADEMARK OFFICE
CERTIFICATE OF CORRECTION

PATENT NO. : 5,358,307  
DATED : October 25, 1994  
INVENTOR(S) : Russell P. Shafer et al.

Page 1 of 2

It is certified that error appears in the above-indentified patent and that said Letters Patent is hereby corrected as shown below:

Column 1, line 12  
"vehicle," should be --vehicle.--

Column 1, line 17  
"also, been but" should be --also been made but--

Column 1, line 18  
after "use" insert --in--

Column 1, line 23  
after "area" insert --making--

Column 1, line 27  
after "innovative" insert --storage--

Column 1, line 28  
after "which" insert --provides--

Column 1, line 30  
"developed," should be --developed.--

Column 2, line 7  
"FIGS." should be --FIG.--

Column 4, line 19  
after "is" delete --/--

UNITED STATES PATENT AND TRADEMARK OFFICE
CERTIFICATE OF CORRECTION

PATENT NO. : 5,358,307
DATED : October 25, 1994
INVENTOR(S) : Russell P. Shafer et al.

It is certified that error appears in the above-indentified patent and that said Letters Patent is hereby corrected as shown below:

Column 4, line 28
"bind" should be --bin--

Column 6, line 2, claim 4
"trap" should be --strap--

Signed and Sealed this

Fourth Day of July, 1995

Attest:

BRUCE LEHMAN

Attesting Officer

Commissioner of Patents and Trademarks